UNITED STATES PATENT OFFICE.

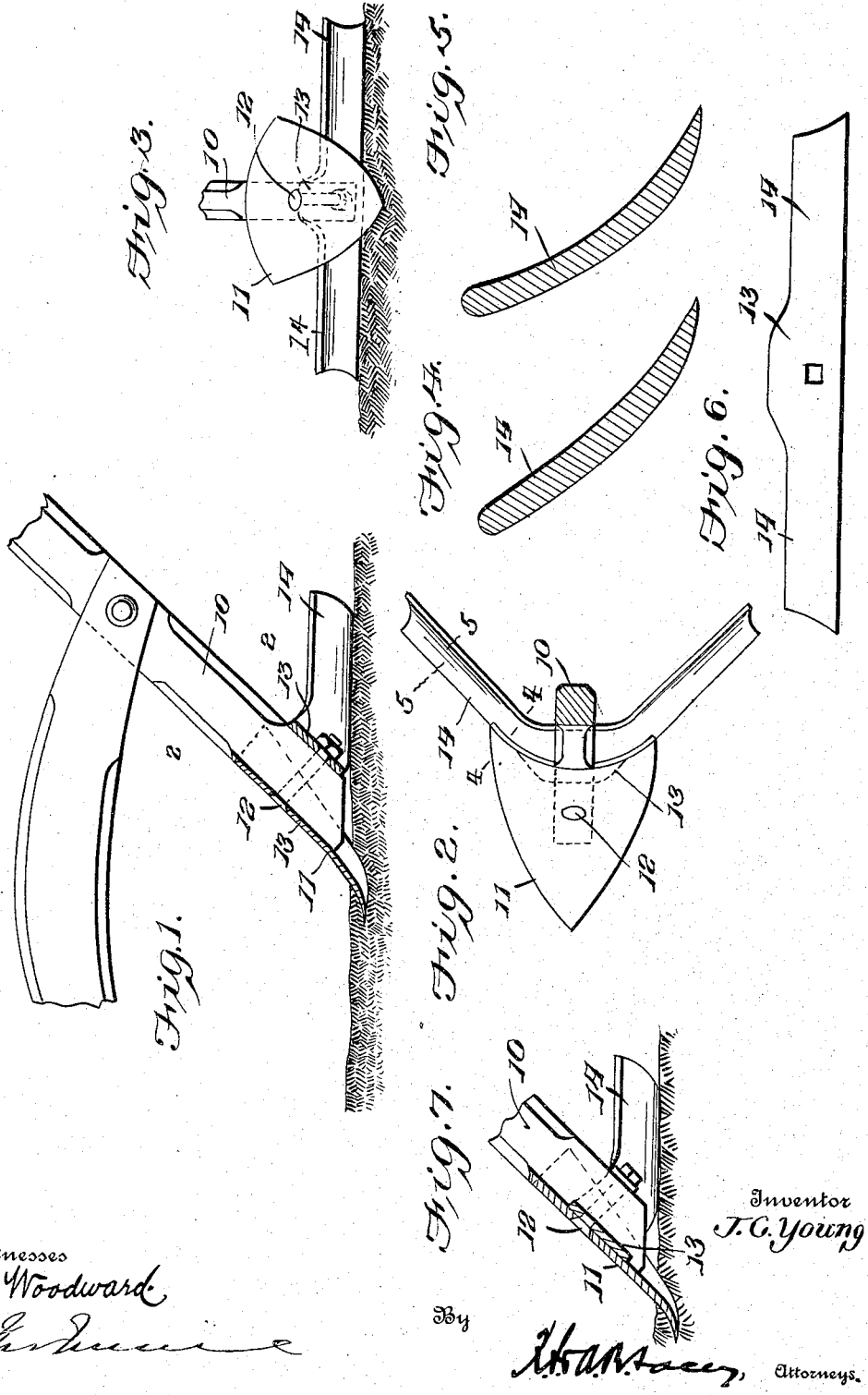

JACOB CLEMMONS YOUNG, OF LONGVIEW, TEXAS.

COTTON-SWEEP.

1,170,947.  Specification of Letters Patent.  Patented Feb. 8, 1916.

Application filed September 10, 1914. Serial No. 861,020.

*To all whom it may concern:*

Be it known that I, JACOB C. YOUNG, citizen of the United States, residing at Longview, in the county of Gregg and State of Texas, have invented certain new and useful Improvements in Cotton-Sweeps, of which the following is a specification.

This invention relates to attachments for plows, cultivators and similar implements, and has for one of its objects to provide a simply constructed attachment adapted to be employed in cultivating cotton and like plants and commonly known as "sweeps" or "scrapers", which may be attached without material structural change to plows of various forms.

Another object of the invention is to provide a simply constructed device of this character which will scrape and cultivate the earth in close proximity to the plants and roll the earth over upon the roots of the plants.

With these and other objects in view the invention consists in certain novel features of construction to be hereinafter shown and described and then specifically pointed out in the claim and in the drawings illustrative of the preferred embodiment of the invention.

Figure 1 is a side elevation partly in section of a portion of a conventional plow with the improved attachment applied, the plow shovel or share being in section. Fig. 2 is a plan view of the parts shown in Fig. 1 with the standard in section on the line 2—2 of Fig. 1. Fig. 3 is a front elevation of the parts shown in Fig. 2. Fig. 4 is an enlarged transverse section of one of the sweep wings in section on the line 4—4 of Fig. 2. Fig. 5 is an enlarged transverse section of one of the sweep wings in section on the line 5—5 of Fig. 2. Fig. 6 is a view of the blank from which the sweep wings are constructed. Fig. 7 is a view similar to Fig. 1 illustrating a modification in the construction.

Corresponding and like parts are referred to in the following description and indicated in all the views of the accompanying drawings by the same reference characters.

The improved device comprises coacting wings diverging rearwardly and outwardly, preferably at an angle of approximately 78° and united by a flat central portion, the upper and lower edges of the wing portions extending in parallel relation, and the forward faces of the wings being curved transversely and gradually increasing in the depth of the curve from the inner forward end to the outer rearward end, so that the earth displaced by the wings as they are drawn forwardly is gradually overturned and discharged from the outer rear ends of the wings.

The improved attachment may be adapted without material structural change to plows of various forms and makes, and will usually be attached to the standard, preferably at the rear.

Under some circumstances, or with some forms of plow, the attachment may be applied to the front of the standard, or between the standard and the share or shovel. For the purpose of illustration, the improved device is shown applied to a conventional standard 10 of an ordinary shovel plow, the share or moldboard is usually attached to the standard by a single bolt represented at 12.

The improved attachment is preferably constructed from a single strip of metal, preferably tempered steel, and includes a flat central portion indicated at 13 and rearwardly and laterally diverging wings represented as a whole at 14 and having their upper longitudinal edges rounded, as shown.

When applied to the rear face of the standard as shown in Figs. 1, 2 and 3, the flat central portion 13 will be held in position by the nut 15 of the bolt 12, which latter passes through a preferably rectangular opening formed in the central portion 13 of the sweep, and when applied to the forward face of the standard as shown in Fig. 7, the flat central portion 13 will be received in a recess in the forward face of the standard 10 with the aperture for the bolt 12 preferably registering with an aperture in the portion 13 of the attachment, to receive the bolt 12, thus to prevent lateral movement of the sweep with respect to the standard.

The diverging portions 14 of the improved device are formed with their forward faces curved transversely and gradually increasing in depth from the central portion 13 to the outer ends of the wings and with the curved surfaces sloping rearwardly and upwardly as illustrated in Figs. 4 and 5.

Fig. 4 represents an enlarged transverse section of one of the wings 14 relatively near the central flat portion 13 as indicated in Fig. 2, and is shown with a relatively flat forward face, while Fig. 5 represents a transverse section of one of the wings near its outer end and showing the forward face considerably deeper than at the inner end of the wing. It will here be noted that the upper longitudinal edges of the wings of the sweep are rounded, while the lower longitudinal edges are sharpened and constitute cutting edges, these cutting edges being produced by curving or rounding the rear faces of the wings at the lower edges thereof and extending said rounded faces downwardly and forwardly until they merge into or intersect the concave forward faces of the wings, as best shown in cross section in Figs. 4 and 5 of the drawings. By this means as the plow is drawn forwardly, weeds or other foreign growths are severed and the upper portion of the earth gradually overturned and deposited upon the plants and without injury thereto. When not required, the attachment may be readily removed by disengaging the holding bolt 12 and restoring the share or shovel 11 to position upon the standard. The recess in the standard for the flat portion 13 when arranged as shown in Fig. 7 does not interfere with the ordinary uses of the plow, as will be obvious.

The improved device is simple in construction, can be inexpensively manufactured and applied by any person without previous skill or knowledge or experience to plows already manufactured, or the improvement may be applied to the plows when manufactured and used when required or removed when not required.

Having thus described the invention, what is claimed as new is:—

A sweep comprising a central forwardly inclined portion having an opening therein for the reception of an attaching device and provided with integral diverging wings of uniform width and length and disposed at an angle of approximately seventy-eight degrees, the upper longitudinal edges of said wings being rounded and the forward faces thereof concave and gradually increasing in depth from the central portion to the outer ends of the wings, the rear faces of the wings at the lower edges thereof being curved downwardly and forwardly and gradually merged into the concave faces of said wings to form cutting edges.

In testimony whereof I affix my signature in presence of two witnesses.

JACOB CLEMMONS YOUNG. [L. S.]

Witnesses:
 NORA McCLURE,
 T. E. LACY.

Copies of this patent may be obtained for five cents each, by addressing the "Commissioner of Patents, Washington, D. C."